US010504112B2

(12) United States Patent
Lee et al.

(10) Patent No.: US 10,504,112 B2
(45) Date of Patent: Dec. 10, 2019

(54) METHOD, SERVER, AND SYSTEM FOR PROCESSING A TRANSPORTATION FARE

(71) Applicant: LG CNS CO. LTD., Seoul (KR)

(72) Inventors: Chang Ha Lee, Seoul (KR); Min Jeong Son, Seoul (KR)

(73) Assignee: LG CNS CO., LTD., Seoul (KR)

( * ) Notice: Subject to any disclaimer, the term of this patent is extended or adjusted under 35 U.S.C. 154(b) by 975 days.

(21) Appl. No.: 14/469,495

(22) Filed: Aug. 26, 2014

(65) Prior Publication Data

US 2016/0042347 A1   Feb. 11, 2016

(30) Foreign Application Priority Data

Aug. 8, 2014 (KR) ........................ 10-2014-0102180

(51) Int. Cl.
| | | |
|---|---|---|
| *G06Q 40/00* | (2012.01) | |
| *G06Q 20/40* | (2012.01) | |
| *G06Q 20/14* | (2012.01) | |
| *G06Q 50/30* | (2012.01) | |

(52) U.S. Cl.
CPC .......... *G06Q 20/40* (2013.01); *G06Q 20/145* (2013.01); *G06Q 50/30* (2013.01)

(58) Field of Classification Search
CPC .................................................... G06Q 20/40
USPC .............................................. 705/13, 34–45
See application file for complete search history.

(56) References Cited

U.S. PATENT DOCUMENTS

| 5,043,561 A | * | 8/1991 | Kimata ................. G07B 11/00 235/375 |
|---|---|---|---|
| 2003/0163522 A1 | * | 8/2003 | Nakamura ............ H04L 63/104 709/203 |
| 2007/0187491 A1 | | 8/2007 | Godwin et al. |
| 2008/0156873 A1 | | 7/2008 | Wilhelm et al. |

(Continued)

FOREIGN PATENT DOCUMENTS

| EP | 2846300 A1 | 3/2015 |
|---|---|---|
| JP | 2013-254328 A | 12/2013 |

(Continued)

OTHER PUBLICATIONS

European Search Report and Written Opinion for EP 15180135.4, dated Nov. 6, 2015.

(Continued)

*Primary Examiner* — Chia-Yi Liu

(57) ABSTRACT

A method, a server, and a system includes a central server configured to compare an authorization result of a fare payment means upon boarding a transportation means with an authorization result of the fare payment means upon leaving the transportation means, determine whether to update at least one of a boarding terminal and a departure terminal based on the comparison result, and transmit update information to at least one of the boarding terminal and the departure terminal based on the determination result. The boarding terminal performs an authorization process of the fare payment means upon boarding if a network connection between the central server and the boarding terminal is unstable, and the departure terminal performs an authorization process of the fare payment means upon leaving if a network connection between the central server and the departure terminal is unstable.

18 Claims, 6 Drawing Sheets

(56) References Cited

U.S. PATENT DOCUMENTS

| | | | |
|---|---|---|---|
| 2009/0090772 A1* | 4/2009 | Lee | G07B 15/02 |
| | | | 235/382 |
| 2011/0165836 A1 | 7/2011 | Dixon et al. | |
| 2011/0166997 A1 | 7/2011 | Dixon et al. | |
| 2012/0024951 A1 | 2/2012 | Graeber | |
| 2012/0254040 A1 | 10/2012 | Dixon et al. | |
| 2013/0173357 A1 | 7/2013 | Lishak | |

FOREIGN PATENT DOCUMENTS

| | | |
|---|---|---|
| KR | 10-2000-0036744 A | 7/2000 |
| KR | 10-2006-0016570 A | 2/2006 |

OTHER PUBLICATIONS

Office Action from European Patent Office for Application No. 15180135.4, dated Dec. 18, 2017.

* cited by examiner

| AUTHORIZATION UPON BOARDING | | AUTHORIZATION UPON LEAVING | | UPDATE TERMINAL? |
|---|---|---|---|---|
| SUBJECT OF AUTHORIZATION | | SUBJECT OF AUTHORIZATION | | |
| BOARDING TERMINAL | SERVER | DEPARTURE TERMINAL | SERVER | |
| O | | X | | YES |
| O | | O | | NO |
| O | | | X | YES |
| O | | | O | NO |
| | O | X | | YES |
| | O | O | | NO |
| | O | | X | YES |
| | O | | O | NO |

FIG. 5

METHOD, SERVER, AND SYSTEM FOR PROCESSING A TRANSPORTATION FARE

CROSS-REFERENCE TO RELATED APPLICATIONS

The present application claims priority to Korean Patent Application No. 10-2014-0102180, filed on Aug. 8, 2014, which is incorporated herein by reference in its entirety.

TECHNICAL FIELD

Embodiments of the present disclosure relate to a method, a server, and a system for processing a transportation fare.

BACKGROUND

When a card terminal (or a card reader) reads a card and transmits payment data to a server, the server approves the payment data and provides the approval result to the card terminal. When a plurality of card terminals reads a plurality of cards simultaneously and transmits payment data to the server simultaneously, the server needs a lot of time to process the payment data and the processing load on the server is high. In addition, when a communication failure occurs between the card terminal and the server, it is difficult for the server or the card reader to promptly receive payment data or approval for the transaction.

SUMMARY

According to an embodiment, the accuracy of approval or disapproval of a fare payment means can be increased even when the state of a network connection is unstable.

According to an embodiment, approval of a fare payment means upon boarding and leaving a means of transportation can be promptly performed even when a network connection is unstable.

According to an embodiment, a central server compares authorization results of a fare payment means upon boarding and leaving, and updates information stored in at least one of a boarding terminal and a departure terminal. Therefore, the accuracy of approval or disapproval of the fare payment means can be increased even when the state of the network connection is unstable.

According to an embodiment, in a case where the connection state of the network is unstable, the boarding terminal and the departure terminal perform an independent authorization process of the fare payment means and then transmit the authorization result to the central server or the authority server when the connection state of the network is stable. As a result, the approval of the fare payment means upon boarding and leaving can be promptly performed.

Embodiments are directed to a method, a server, and a system for processing a transportation fare.

A method of a central server according to an embodiment includes comparing an authorization result of a fare payment means upon boarding a transportation means with an authorization result of the fare payment means upon leaving the transportation means, determining whether to update information stored in at least one of a boarding terminal and a leaving terminal, based on the comparison result, and transmitting update information to at least one of the boarding terminal and the leaving terminal, based on the determination result.

The method may further include determining to update at least one of the boarding terminal and the departure terminal when the authorization result upon boarding and the authorization result upon leaving are different from each other.

In a method in accordance with an embodiment, the update information is transmitted to at least one of the boarding terminal and the departure terminal if authorization upon boarding is performed by the boarding terminal and the authorization upon leaving is performed by the central server.

In a method in accordance with an embodiment, the update information is transmitted to at least one of the boarding terminal and the departure terminal if authorization upon boarding is performed by the central server and authorization upon leaving is performed by the departure terminal.

In a method in accordance with an embodiment, the update information is periodically transmitted to at least one of the boarding terminal and the departure terminal if authorization upon boarding and authorization upon leaving are performed by the central server.

A method in accordance with an embodiment may further include requesting the update information related to the authorization of the fare payment means from an authority server.

A method in accordance with an embodiment may further include receiving an authorization request for the approval of the fare payment means from the boarding terminal or the departure terminal, and requesting an authority server for authorization of the fare payment means upon boarding or leaving according to the authorization request.

A method in accordance with an embodiment may further include receiving an authorization request for the approval of the fare payment means from the boarding terminal or the departure terminal, determining a connection state of a network between an authority server and the central server, and performing, by the central server, an authorization process upon boarding or leaving, based on the connection state of the network between the authority server and the central server.

A method in accordance with an embodiment may further include receiving the authorization result of the fare payment means upon boarding or leaving from the authority server. The authorization result may be determined by the authority server, based on a list including information on whether the fare payment means is usable.

A method in accordance with an embodiment may further include storing the authorization result of the fare payment means upon boarding or leaving, and transmitting the authorization result of the fare payment means upon boarding or leaving to the boarding terminal or the departure terminal.

A method in accordance with an embodiment may further include transmitting the update information to at least one of the boarding terminal and the departure terminal at regular time intervals.

A central server in accordance with an embodiment includes a processor configured to compare an authorization result of a fare payment means upon boarding a transportation means with an authorization result of the fare payment means upon leaving the transportation means, and determine whether to update at least one of a boarding terminal and a departure terminal, based on the comparison result. The central server also includes an interface unit configured to transmit update information to at least one of the boarding terminal and the departure terminal, based on the determination result.

In a central server in accordance with an embodiment, if the authorization result upon boarding and the authorization result upon leaving are different from each other, the processor determines to update at least one of the boarding terminal and the departure terminal.

In a central server in accordance with an embodiment, the processor causes the interface unit to transmit a request to an authority server for the authorization of the fare payment means if a network connection between the authority server and the central server is stable, and performs the authorization of the fare payment means if a network connection between the authority server and the central server is unstable.

In a central server in accordance with an embodiment, the interface unit transmits the update information to at least one of the boarding terminal and the departure terminal if the authorization upon boarding is performed by the boarding terminal and the authorization upon leaving is performed by the central server. The interface unit transmits the update information to at least one of the boarding terminal and the departure terminal when the authorization upon boarding is performed by the central server and the authorization upon leaving is performed by the departure terminal. The interface unit periodically transmits the update information to at least one of the boarding terminal and the departure terminal when the authorization upon boarding and the authorization upon leaving are performed by the central server.

In a central server in accordance with an embodiment, the interface unit receives the authorization result of the fare payment means upon boarding or leaving from an authority server. The authorization result is determined by the authority server based on a list including information on whether the fare payment means is usable.

A central server in accordance with an embodiment further includes a memory configured to store the authorization result of the fare payment means upon boarding or leaving.

A system in accordance with an embodiment includes a boarding terminal configured to read a fare payment means upon boarding a transportation means, a departure terminal configured to read the fare payment means upon leaving the transportation means, and a central server configured to compare an authorization result of the fare payment means upon boarding the transportation means with an authorization result of the fare payment means upon leaving the transportation means, determine whether to update at least one of the boarding terminal and the departure terminal based on the comparison result, and transmit update information to at least one of the boarding terminal and the departure terminal based on the determination result.

In a system in accordance with an embodiment, the boarding terminal performs an authorization process of the fare payment means upon boarding if a network connection between the central server and the boarding terminal is unstable, and the departure terminal performs an authorization process of the fare payment means upon leaving if a network connection between the central server and the departure terminal is unstable.

A system in accordance with an embodiment may further include an authority server configured to determine whether to approve the fare payment means upon boarding or leaving, based on a list including information on whether the fare payment means is usable.

BRIEF DESCRIPTION OF THE DRAWINGS

FIG. 5 is a table illustrating when information stored in a boarding terminal or a departure terminal is to be updated according to an embodiment.

DESCRIPTION OF EMBODIMENTS

Figure 1:
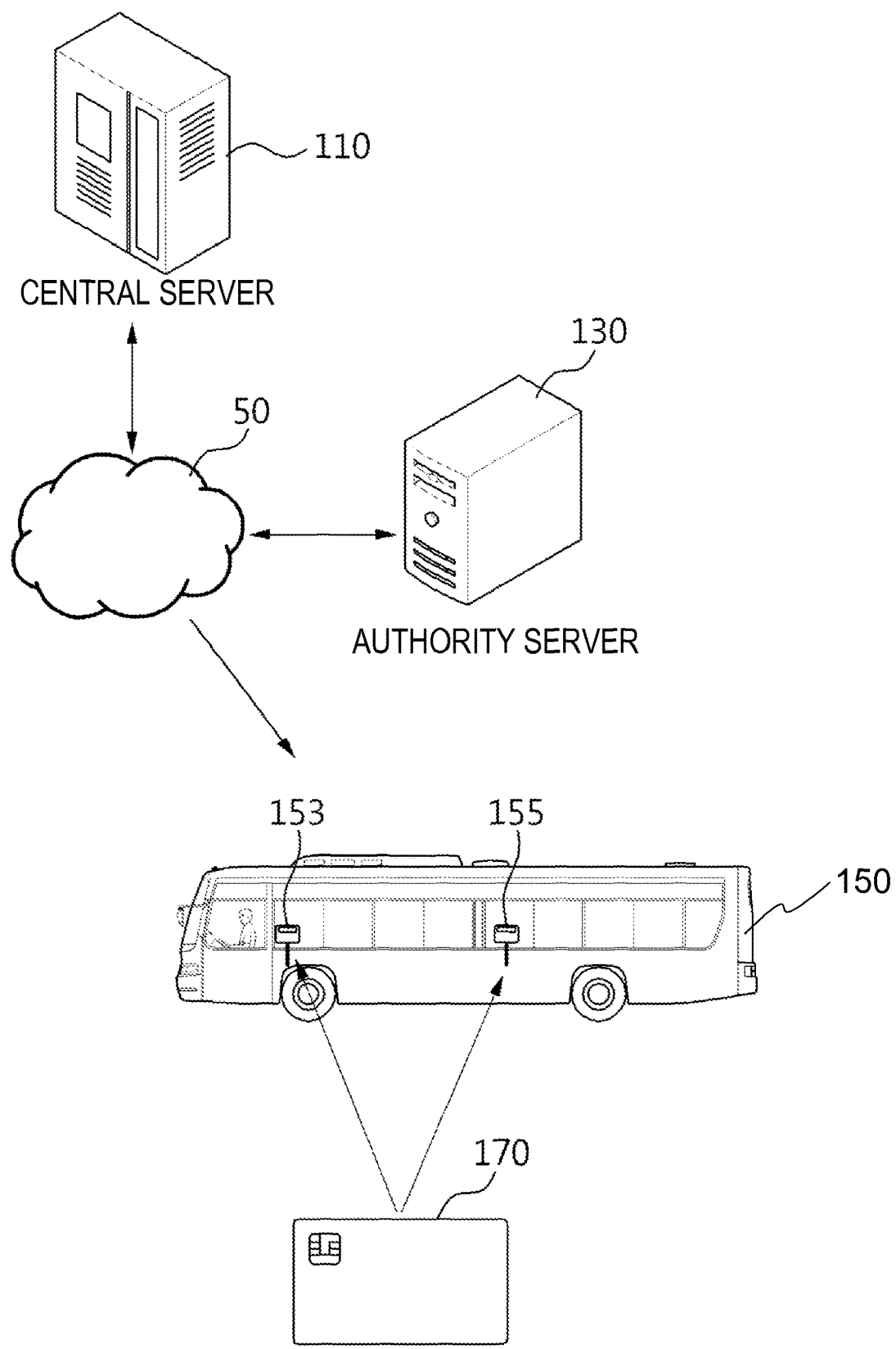
FIG. 1 illustrates a system for processing a transportation fare according to an embodiment.

Hereafter, embodiments of the present disclosure will be described below in more detail with reference to the accompanying drawings. Throughout the drawings, like reference numerals refer to like parts.

The following embodiments may be modified in various ways. Embodiments are not limited by the descriptions provided herein, but may include all modifications, equivalents or substitutes thereof.

The terms used to describe embodiments are used only for explaining the specific embodiments, and do not limit the embodiments. Terms in a singular form do not exclude plural forms unless the contrary is indicated. In this specification, the meaning of "include", "comprise" or "have" specifies a property, a figure, a step, a process, an element, a component, or a combination thereof which is described in the specification, without excluding one or more other properties, numbers, steps, processes, elements, components, or combinations thereof.

The terms used herein, including technical or scientific terms, have the same meanings as the terms which are generally understood by those skilled in the art to which the present disclosure pertains, unless they are differently defined. The terms defined in a generally used dictionary may be interpreted to have meanings which coincide with contextual meanings in the related art. If terms are not clearly defined in this specification, the terms may not be interpreted as having ideal or excessively formal or technical meanings.

In the accompanying drawings, like reference numerals refer to like elements, regardless of reference numerals, and the duplicative descriptions thereof may be omitted. In the present disclosure, detailed descriptions related to well-known functions or configurations may be omitted so that the subject matter of the present disclosure is not unnecessarily obscured.

FIG. 1 illustrates a system that processes a transportation fare according to an embodiment.

Referring to FIG. 1, a system according to an embodiment includes a central server 110, an authority server 130, terminals 153 and 155, and a fare payment means 170.

The central server 110, the authority server 130, and the terminals 153 and 155 may be connected to one another through a wired/wireless network 50. The terminals may include a boarding terminal 153 and a departure terminal 155.

The central server 110 compares an authorization result of the fare payment means 170 upon boarding a transportation means 150 with an authorization result of the fare payment means 170 upon leaving the transportation means 150. The central server 110 determines whether to update at least one of the boarding terminal 153 and the departure terminal 155, based on a result of the comparison. In an embodiment, if the authorization result upon boarding and the authorization result upon leaving are different from each other, the central server 110 may determine to update at least one of the boarding terminal 153 and the departure terminal 155.

The central server 110 may transmit update information to at least one of the boarding terminal 153 and the departure terminal 155, based on the determination result.

For example, in an embodiment, if the network connection between the boarding terminal 153 or departure terminal 155 and the central server 110 is unstable, the boarding terminal 153 or the departure terminal 155 may perform an independent authorization process on the fare payment means 170. If the network connection is stable, then the central server 110, which includes the latest authorization information on the fare payment means 170, transmits update information to the boarding terminal 153 or the departure terminal 155 and performs the authorization process. Thus, if the authorization upon boarding is performed by the boarding terminal 153 and the authorization upon leaving is performed by the central server 110, the central server 110 may transmit update information to the boarding terminal 153 once the network connection is stable again. If the authorization upon boarding is performed by the central server 110 and the authorization upon leaving is performed by the departure terminal 155, the central server 110 may transmit update information to the departure terminal 155 once the network connection is stable again.

In addition, if the authorization upon boarding and the authorization upon leaving are performed by the central server 110, the central server 110 may transmit update information to at least one of the boarding terminal 153 and the departure terminal 155 periodically. In an embodiment, the central server 110 may transmit update information to the boarding terminal 153 and the departure terminal 153 at regular time intervals.

The central server 110 may request the authority server 130 for update information related to the approval or disapproval of the fare payment means 170, i.e., authorization of the fare payment means 170.

For example, if it is determined that the authorization result upon boarding and the authorization result upon leaving with respect to the fare payment means 170 are not identical to each other, the central server 110 may request the authority server 130 for update information related to the authorization of the fare payment means 170.

The authority server 130 may determine whether to approve or disapprove the fare payment means 170 upon boarding or leaving, based on a list containing information regarding whether the fare payment means 170 is usable.

The boarding terminal 153 may read the fare payment means 170 when a user boards the transportation means 150. The boarding terminal 153 may read the fare payment means 170 and determine whether to approve the fare payment means 170. The boarding terminal 153 may approve of the fare payment means 170 upon boarding after receiving an authorization result from the central server 110, if there is a stable connection between the central server 110 and the boarding terminal 153 over the network 50.

If the connection state of the network 50 between the central server 110 and the boarding terminal 153 is unstable, the boarding terminal 153 may perform an independent authorization process of the fare payment means 170 upon boarding. In an embodiment, the boarding terminal 153 performs the independent authorization process of the fare payment means 170 upon boarding, based on a list containing information regarding whether the fare payment means 170 is usable. The list is obtained based on update information from the central server 110.

The departure terminal 155 may read the fare payment means 170 when the user leaves the transportation means 150. The departure terminal 155 may also determine whether to approve the fare payment means 170. As in the boarding terminal 153, the departure terminal 155 may approve of the fare payment means 170 after receiving an authorization result from the central server 110 if the state of the connection between the central server 110 and the departure terminal 155 over the network 50 is stable. If the network connection is unstable, the departure terminal 155 may perform an independent authorization process to approve or disapprove the fare payment means 170. In an embodiment, the departure terminal 155 performs the independent authorization process of the fare payment means 170 upon leaving, based on a list containing information regarding whether the fare payment means 170 is usable. The list is obtained based on update information from the central server 110.

The fare payment means 170 may be, for example, a smart card, such as a transportation card, a credit card, or a check card, or another payment means including a similar payment functions as a smart card.

A method, a central server, and a system for processing a transportation fare in accordance with embodiments can be applied in various ways for fare payment in a transportation system. For example, embodiments may be applied in fare payment upon entering or exiting a tollgate, and in fare payment upon entering or exiting a vehicle in public transportation, such as a bus, and the like.

Therefore, a "boarding terminal" may include a terminal installed at an entrance of a tollgate, a terminal installed in a means of transportation, or the like, depending on the embodiment. A "departure terminal" may include a terminal installed at an exit of a tollgate, a terminal installed in a means of transportation, or the like, depending on the embodiment. In an embodiment, a boarding terminal and a departure terminal may be a single terminal performing an authorization or approval process at different times (e.g., upon boarding or leaving a means of transportation, upon entering or exiting a tollgate, etc.).

Figure 2:
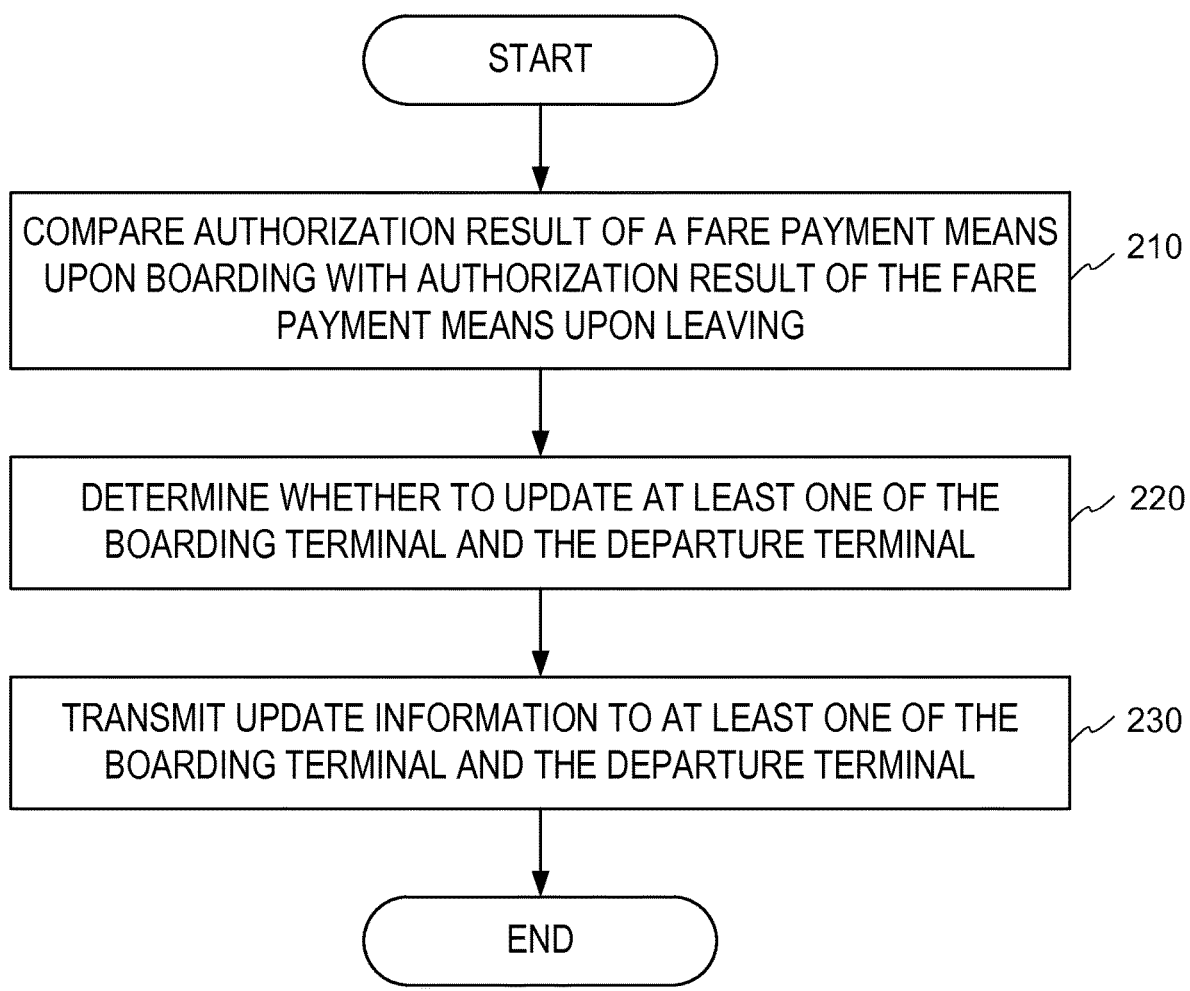
FIG. 2 is a flowchart illustrating a method for processing a transportation fare in a central server according to an embodiment.

FIG. 2 is a flowchart illustrating a method for processing a transportation fare in a central server according to an embodiment.

Referring to FIG. 2, at step 210, the central server according to an embodiment may compare an authorization result upon boarding a transportation means and an authorization result upon leaving the transportation means with respect to a fare payment means.

The authorization of the fare payment means upon boarding may be performed by one of the central server and the boarding terminal. The authorization of the fare payment means upon leaving may be performed by one of the central server and the departure terminal.

At step 220, the central server may determine whether to update at least one of the boarding terminal and the departure terminal, based on a result of the comparison of step 210. If the authorization result upon boarding and the authorization result upon leaving are different from each other, the central server may determine to update at least one of the boarding terminal and the departure terminal.

At step 230, the central server may transmit update information to at least one of the boarding terminal and the departure terminal, based on a result of the determination of step 220.

Figure 3:
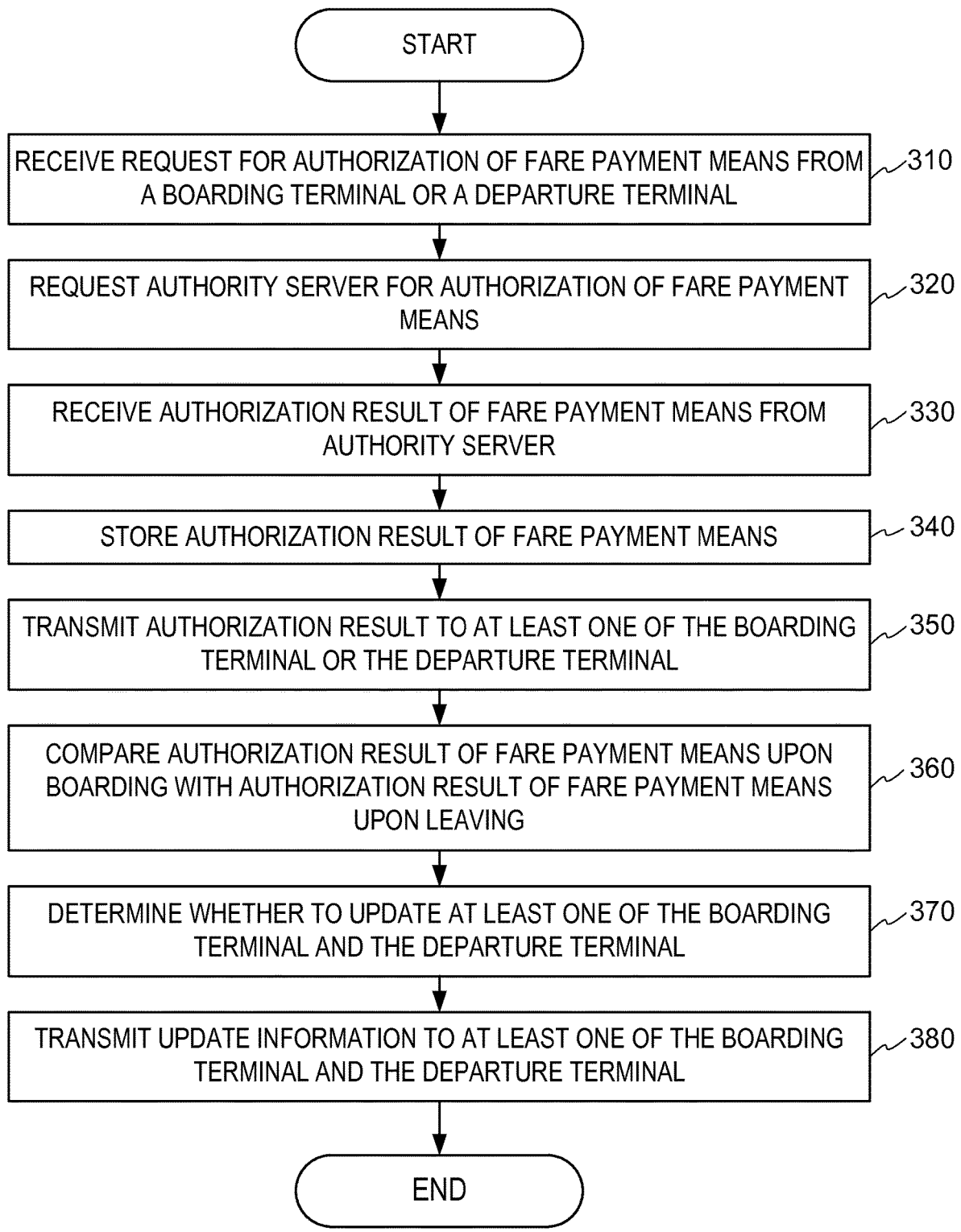
FIG. 3 is a flowchart illustrating a method for processing a transportation fare in a central server according to another embodiment.

FIG. 3 is a flowchart illustrating a method for processing a transportation fare in a central server according to another embodiment.

Referring to FIG. 3, at step 310, the central server according to another embodiment may receive a request for authorization of a fare payment means from a boarding terminal or a departure terminal.

At step 320, the central server may request authorization from an authority server for approval of the fare payment means upon boarding or leaving through a network according to the authorization request received at step 310. The central server may request the authority server for the authorization of the fare payment means upon boarding or leaving or may itself perform the approval upon boarding or leaving, based on the connection state of a network between the authority server and the central server.

At step 330, the central server may receive the authorization result of the fare payment means upon boarding or leaving from the authority server. In an embodiment, the authorization result, e.g., approval or disapproval of the fare payment means or the fare payment transaction, may be determined by the authority server based on a list containing information regarding whether the fare payment means is usable. The list may include, for example, information on whether use of the fare payment means has been suspended or information indicating a stolen or lost card.

At step 340, the central server may store the authorization result of the fare payment means upon boarding or leaving.

At step 350, the central server may transmit the authorization result of the fare payment means, which is stored at step 340, to the boarding terminal or the departure terminal.

At step 360, the central server may compare the authorization result upon boarding and the authorization result upon leaving. The central server compares the authorization result upon boarding and the authorization result upon leaving so as to resolve errors that may occur if the authorization results are transmitted when there is a network failure between the central server and the terminals.

At step 370, the central server may determine whether to update at least one of the boarding terminal and the departure terminal, based on a result of the comparison of step 360.

At step 380, the central server may transmit update information to at least one of the boarding terminal and the departure terminal, based on the determination of step 370.

Figure 4:
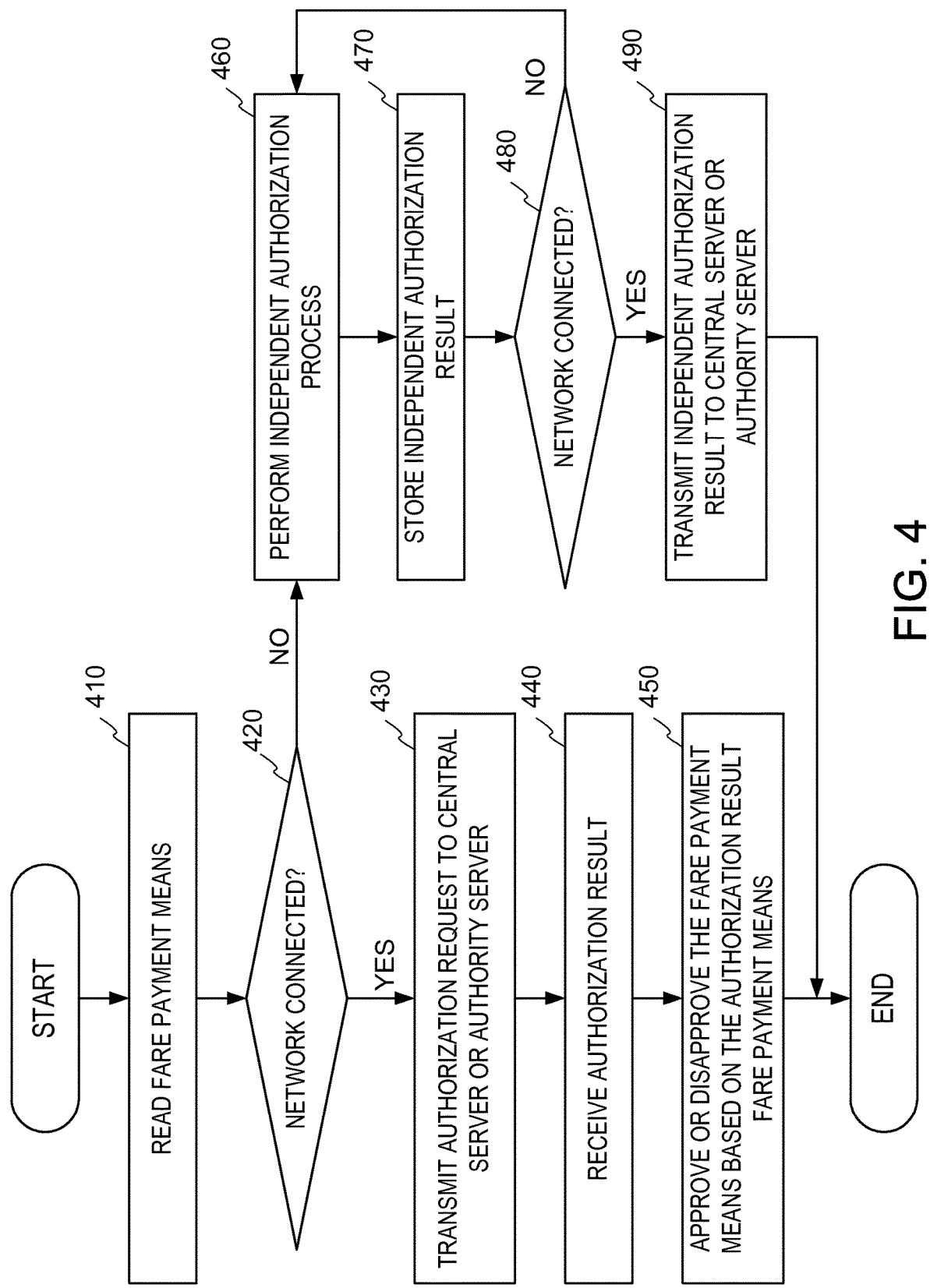
FIG. 4 is a flowchart illustrating a method for processing a transportation fare in a terminal according to an embodiment.

FIG. 4 is a flowchart illustrating a method for processing a transportation fare in a terminal according to an embodiment.

Referring to FIG. 4, at step 410, the terminal according to an embodiment may read a fare payment means. The fare payment means may be, for example, a smart card, such as a transportation card, a credit card, a check card, or another payment means having a payment function similar to a smart card.

In an embodiment, when the fare payment means approaches the terminal and comes within a predetermined distance, the terminal may read the fare payment means and obtain information related to authorization.

At step 420, the terminal may determine whether a connection state of a network between the terminal and a central server or between the terminal and an authority server is stable (e.g., whether the network is connected).

At step 430, if it is determined at step 420 that the network connection is stable, the terminal may transmit an authorization request to the central server or the authority server in order to approve the fare payment means.

At step 440, the terminal may receive an authorization result from the central server or the authority server in response to the request.

At step 450, the terminal may approve or disapprove the fare payment means according to the authorization result received at step 440.

At step 460, if it is determined at step 420 that the network is not connected, the terminal may itself perform an independent authorization process on the fare payment means with reference to a list stored in the terminal. That is, in an embodiment, the terminal may perform an authorization process to approve or disapprove the fare payment means based on authorization information stored therein. At step 470, the terminal may store the independent authorization result.

At step 480, the terminal may determine again whether the network is connected.

If it is determined at step 480 that the network is connected, at step 490, the terminal may transmit the independent authorization result, which has been stored at step 470, to the central server or the authority server.

If it is determined at step 480 that the network is not connected, the terminal may perform the processes at steps 460 and 470 repeatedly until the network is connected. After that, once the network is connected, the terminal may transmit independent authorization results stored therein to the central server or the authority server.

FIG. 5 is a table indicating whether a boarding terminal and/or a departure terminal are to be updated depending on whether an authorization process is performed by the boarding terminal, the departure terminal, or the central server.

Upon boarding, if the fare payment means is disapproved by the boarding terminal, a user is not permitted to board on the means of transportation using the fare payment means. Therefore, FIG. 5 illustrates an embodiment in which the fare payment means is approved by the boarding terminal or the central server upon boarding.

In an embodiment, if the approval of the fare payment means is performed by the boarding terminal upon boarding, but the approval is not performed by the departure terminal or the central server upon leaving, then the terminal is to be updated because the connection state of the network is unstable between the central server and the departure terminal.

In addition, in an embodiment, if the approval of the fare payment means is performed by the central server upon boarding, but the approval of the fare payment means is not performed by the departure terminal or the central server upon leaving, then the terminal is to be updated.

When the terminal is to be updated, the central server may transmit update information received from the authority server to the terminal. In an embodiment, the update information may be the latest information related to the authorization of the fare payment means.

Figure 6:
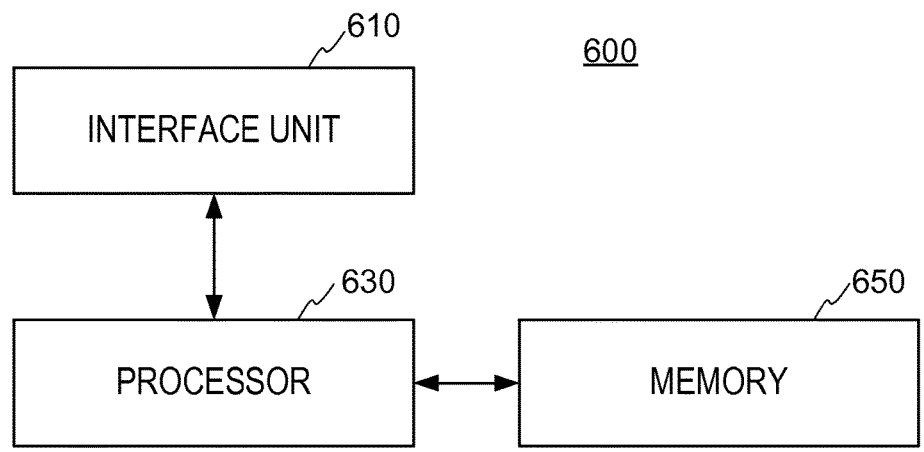
FIG. 6 is a block diagram of a central server according to an embodiment.

FIG. 6 is a block diagram of a central server for processing a transportation fare according to an embodiment.

Referring to FIG. 6, a central server 600 according to an embodiment may include an interface unit 610, a processor 630, and a memory 650.

The interface unit 610 may transmit update information to at least one of a boarding terminal and a departure terminal, based on a determination to update the boarding terminal or the departure terminal. This determination is made by the processor 630.

The interface unit 610 may receive an authorization result upon boarding or an authorization result upon leaving from at least one of the boarding terminal, the departure terminal, and the authority server, based on the state of the connection of a network between the central server and the boarding terminal or the departure terminal.

For example, if the connection state of the network is stable between the central server and the boarding terminal or between the central server and the departure terminal, the interface unit 610 may receive the authorization result of the fare payment means, which is the result of an independent authorization process performed by the boarding terminal or the departure terminal upon boarding or leaving.

If the connection state of the network is unstable between the central server and the boarding terminal or between the central server and the departure terminal, the interface unit 610 may receive the authorization result of the fare payment means from the authority server upon boarding or leaving.

At this time, the authorization result may be determined by the authority server, based on a list containing information on whether the fare payment means is usable.

If the authorization upon boarding is performed by the boarding terminal and the authorization upon leaving is performed by the central server, or if the authorization upon boarding is performed by the central server and the authorization upon leaving is performed by the departure terminal, the interface unit 610 may transmit update information to at least one of the boarding terminal and the departure terminal.

In addition, if the authorization upon boarding and the authorization upon leaving are performed by the central server, the interface unit 610 may transmit update information to at least one of the boarding terminal and the departure terminal at regular time intervals.

The processor 630 may compare the authorization result of the fare payment means upon boarding and the authorization result of the fare payment means upon leaving, and determine whether to update at least one of the boarding terminal and the departure terminal, based on the comparison result.

The authorization of the fare payment means upon boarding may be performed by one of the central server (or the authority server) and the boarding terminal. In addition, the authorization of the fare payment means upon leaving may be performed by one of the central server (or the authority server) and the departure terminal.

The processor 630 may request the authority server for authorization upon boarding or leaving or the central server may perform the authorization upon boarding or leaving, based on the connection state of the network between the authority server and the central server.

The memory 650 may store the authorization result of the fare payment means upon boarding or leaving. The memory 650 may also store program code, which, when executed by the processor 630, performs a method in accordance with embodiments of the present disclosure.

Figure 7:
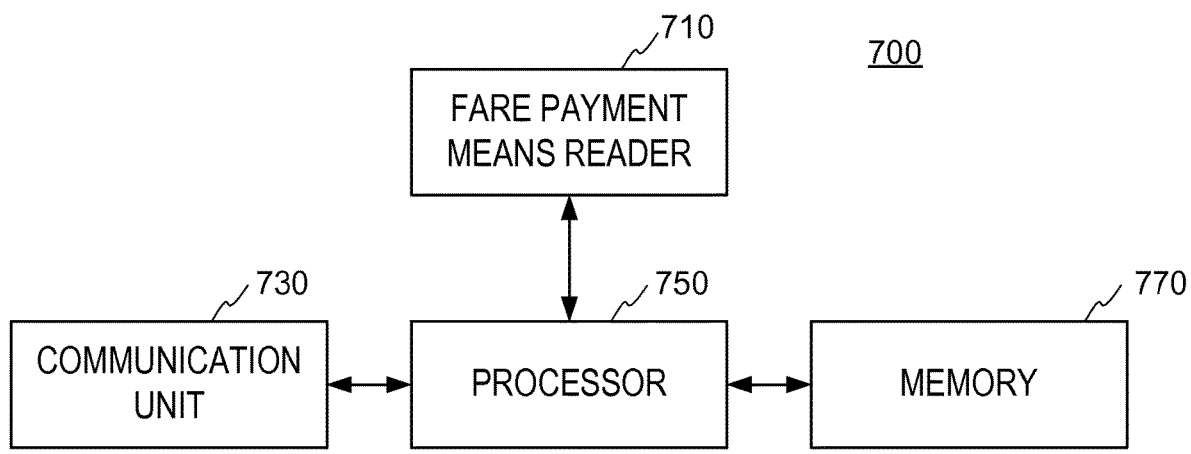
FIG. 7 is a block diagram of a terminal according to an embodiment.

FIG. 7 is a block diagram of a terminal according to an embodiment.

Referring to FIG. 7, a terminal 700 according to an embodiment may include a fare payment means reader 710, a communication unit 730, a processor 750, and a memory 770. The terminal 700 may be a boarding terminal, a departure terminal, or a terminal installed at the entrance or exit of a tollgate.

The fare payment means reader 710 may be a reader capable of reading a fare payment means, for example, a transportation card, a credit card, a check card, or other smart cards.

The communication unit 730 may transmit a request to the central server or the authority server for authorization of the fare payment means. The communication unit 730 may receive the approval result of the fare payment means upon boarding or leaving from the central server or the authority server according to the authorization request.

The processor 750 may perform an independent authorization process for the fare payment means upon boarding or leaving, based on the connection state of a network between the central server and the terminal. That is, the processor 750 performs the independent authorization process if the state of the connection between the central server and the terminal 700 over a network is unstable.

The memory 770 may store the authorization result of the fare payment means upon boarding or leaving, which is performed by the processor 750. The memory 770 may also store program code, which, when executed by the processor 750, performs a method in accordance with embodiments of the present disclosure.

Embodiments of the present disclosure may be implemented in the form of program commands which can be executed through various computer units, and written to computer readable media. The computer readable media may include a program command, a data file, a data structure, or a combination thereof. Examples of the computer readable media may include magnetic media such as a hard disk, a floppy disk and a magnetic tape, optical media such as CD-ROM and DVD, magneto-optical media such as a floptical disk, and hardware devices, such as ROM, RAM and flash memory, configured to store and execute a program command. Examples of the program command may include a machine language code created by a compiler and a high-level language code executed by a computer through an interpreter or the like. The hardware device may be configured to operate as one or more software modules to perform operations of embodiments of the present disclosure, and vice versa.

While various embodiments have been described with reference to the drawings, the present disclosure is not limited to the above-described embodiments, and it will be apparent to those skilled in the art that various changes and modifications may be made from the above description.

Thus, the scope of the present disclosure is not limited to the above-described embodiments, but may be defined by the following claims and equivalents to the claims.

What is claimed is:

1. A server of a transportation system, the server comprising:
a processor configured to:
determine that a network failure occurs between the server and at least one of a first terminal and a second terminal;
compare an authorization result of a fare payment card upon boarding a transportation means with an authorization result of the fare payment card upon leaving the transportation means, based on the occurrence of the network failure, and
determine whether to update authorization information stored in the at least one of the first terminal and the second terminal, based on the comparison result, the first terminal including a card reader for reading the fare payment card upon boarding the transportation means, the second terminal including a card reader for reading the fare payment card upon leaving the transportation means, the authorization information stored in the at least one of the first terminal and the second terminal being related to the approval or disapproval of the fare payment card; and an interface unit configured to:
  transmit update information to at least one of the first terminal and the second terminal when the authorization result upon boarding and the authorization result upon leaving are different from each other,
wherein the at least one of the first terminal and the second terminal is configured to:
  update the authorization information with the update information, and
  perform a prompt authorization process on the fare payment card after reading the fare payment card using the updated authorization information, based on the occurrence of the network failure between the server and the at least one of the first terminal and the second terminal.

2. The server of claim 1, wherein the processor causes the interface unit to transmit a request to an authority server for the authorization of the fare payment card when the authority server is connected to the server, and performs the authorization of the fare payment card when the authority server is disconnected with the server, the authority server being a server that determines whether to approve or disapprove the fare payment card upon boarding or leaving.

3. The server of claim 1,
wherein the interface unit transmits the update information to at least one of the first terminal and the second terminal when the authorization upon boarding is performed by the first terminal and the authorization upon leaving is performed by the server,
wherein the interface unit transmits the update information to at least one of the first terminal and the second terminal when the authorization upon boarding is performed by the server and the authorization upon leaving is performed by the second terminal, and
wherein the interface unit periodically transmits the update information to at least one of the first terminal and the second terminal when the authorization upon boarding and the authorization upon leaving are performed by the server.

4. The server of claim 1, wherein the interface unit receives the authorization result of the fare payment card upon boarding or leaving from an authority server, the authority server being a server that determines whether to approve or disapprove the fare payment card upon boarding or leaving, and
wherein the authorization result is determined by the authority server based on a list including information on whether use of the fare payment card has been suspended or information indicating that the fare payment card is stolen or lost.

5. The server of claim 4, further comprising:
a memory configured to store the authorization result of the fare payment card upon boarding or leaving.

6. A system for processing a transportation fare, the system comprising:
a first terminal including a card reader that is configured to read a fare payment card upon boarding a transportation means;
a second terminal including a card reader that is configured to read the fare payment card upon leaving the transportation means; and a server configured to:
  determine that a network failure occurs between the server and at least one of the first terminal and the second terminal;
  compare an authorization result of the fare payment card upon boarding the transportation means with an authorization result of the fare payment card upon leaving the transportation means, based on the occurrence of the network failure,
  determine whether to update authorization information stored in the at least one of the first terminal and the second terminal based on the comparison result, the authorization information stored in the at least one of the first terminal and the second terminal being related to the approval or disapproval of the fare payment card, and
  transmit update information to the at least one of the first terminal and the second terminal when the authorization result upon boarding and the authorization result upon leaving are different from each other,
wherein the at least one of the first terminal and the second terminal is further configured to:
  update the authorization information with the update information, and
  perform a prompt authorization process on the fare payment card after reading the fare payment card using the updated authorization information based on the occurrence of the network failure between the server and the at least one of the first terminal and the second terminal.

7. The system of claim 6,
wherein the first terminal performs an authorization process of the fare payment card upon boarding based on the occurrence of the network failure between the server and the first terminal, and
wherein the second terminal performs an authorization process of the fare payment card upon leaving based on the occurrence of the network failure between the server and the second terminal.

8. The system of claim 6, further comprising:
an authority server configured to determine whether to approve the fare payment card upon boarding or leaving, based on a list including information on whether use of the fare payment card has been suspended or information indicating that the fare payment card is stolen or lost.

9. A method for a transportation system, the method comprising:
determining that a network failure occurs between a server and at least one of a first terminal and a second terminal;
comparing an authorization result of a fare payment card upon boarding a transportation means with an authorization result of the fare payment card upon leaving the transportation means, based on the occurrence of the network failure;
determining whether to update authorization information stored in the at least one of the first terminal and the second terminal, based on the comparison result, the first terminal including a card reader for reading the fare payment card upon boarding the transportation means, the second terminal including a card reader for reading the fare payment card upon leaving the transportation means, the authorization information stored in the at least one of the first terminal and the second terminal being related to the approval or disapproval of the fare payment card;

transmitting update information to the at least one of the first terminal and the second terminal when the authorization result upon boarding and the authorization result upon leaving are different from each other;

updating the authorization information stored in the at least one of the first terminal and the second terminal with the update information;

storing the updated authorization information in the at least one of the first terminal and the second terminal; and performing a prompt authorization process on the fare payment card after reading the fare payment card using the updated authorization information, based on the occurrence of the network failure between the server and the at least one of the first terminal and the second terminal, wherein determining whether to update the authorization information comprises:

determining whether at least one of authorization for the boarding and authorization for the leaving is performed by the at least one of the first terminal and the second terminal;

determining whether the authorization result upon boarding and the authorization result upon leaving are different when the at least one authorization is performed by the at least one of the first terminal and the second terminal; and determining update of the terminal corresponding to authorization information and an approval result that have been stored in the server most recently among the first terminal and the second terminal, when the authorization result upon boarding and the authorization result upon leaving are different, and wherein the authorization for the boarding is performed by the first terminal based on the occurrence of the network failure between the server and the first terminal, and the authorization for the leaving is performed by the second terminal based on the occurrence of the network failure between the server and the second terminal.

10. The method of claim 9, wherein the update information is transmitted to the at least one of the first terminal and the second terminal when the authorization for the boarding is performed by the first terminal and the authorization for the leaving is performed by the server.

11. The method of claim 9, wherein the update information is transmitted to the at least one of the first terminal and the second terminal when the authorization for the boarding is performed by the server and the authorization for the leaving is performed by the second terminal.

12. The method of claim 9, wherein the update information is periodically transmitted to the at least one of the first terminal and the second terminal when the authorization for the boarding and the authorization for the leaving are performed by the server.

13. The method of claim 9, further comprising:
requesting the update information related to the authorization of the fare payment card from an authority server, the authority server being a server that determines whether to approve or disapprove the fare payment card upon boarding or leaving.

14. The method of claim 9, further comprising:
receiving an authorization request for the approval of the fare payment card from the first terminal or the second terminal; and requesting an authority server for authorization of the fare payment card upon boarding or leaving according to the authorization request when the authority server is connected to the server, the authority server being a server that determines whether to approve or disapprove the fare payment card upon boarding or leaving.

15. The method of claim 14, further comprising:
performing, by the server, the authorization of the fare payment card upon boarding or leaving when the authority server is disconnected with the server.

16. The method of claim 14, further comprising:
receiving the authorization result of the fare payment card upon boarding or leaving from the authority server, wherein the authorization result is determined by the authority server, based on a list including information on whether use of the fare payment card has been suspended or information indicating that the fare payment card is stolen or lost.

17. The method of claim 16, further comprising:
storing the authorization result of the fare payment card upon boarding or leaving; and transmitting the authorization result of the fare payment card upon boarding or leaving to the first terminal or the second terminal.

18. The method of claim 9, further comprising:
transmitting the update information to the at least one of the first terminal and the second terminal at regular time intervals.

* * * * *